Oct. 14, 1958     R. ADELL     2,856,229

PROTECTIVE TRIM MOLDING FOR VEHICLE DOOR EDGES

Filed June 17, 1955

INVENTOR.
ROBERT ADELL

BY Gregory S. Dolgorukov

ATTORNEY.

United States Patent Office 2,856,229
Patented Oct. 14, 1958

2,856,229

PROTECTIVE TRIM MOLDING FOR VEHICLE DOOR EDGES

Robert Adell, Detroit, Mich., assignor to Franklin Z. Adell and Marvin M. Adell, Detroit, Mich.

Application June 17, 1955, Serial No. 516,101

1 Claim. (Cl. 296—44)

This invention relates to automobiles and more particularly to an improved ornamental and protective molding for the trailing edges of its swinging closures, such as doors.

Considerable difficulties arose in applying ornamental and protective molding to the edges of closures, such as doors. Such molding is relatively narrow, being approximately ¼" in width. It is applied to a smooth painted edge of the door, and is subjected in operation to road vibrations and shocks caused by closing the door. It was found that unless gripping action of the molding on the door edge is very strong, the molding may slip off partially, particularly at its ends, and thus presents the danger of catching clothing or anything brushing against it, whereupon the molding is pulled off completely from the edge.

On the other hand, making the molding thicker and more rigid to have a stronger gripping action, i. e., to have the lips or legs of its generally U-shaped cross section exert a stronger resilient grip on the edge, presents the danger of scratching and scuffing of the paint and, therefore, damaging the door edge in applying the molding thereto.

One of the objects of the present invention is to provide an improved ornamental and protective molding for the trailing edges of swinging closures, particularly doors of automobiles, whereby the above difficulties and disadvantages are overcome and largely eliminated.

Another object of the present invention is to provide an improved ornamental and protective molding made of resilient material, in which resilient grip of the molding on the edge is produced not only due to the cross sectional characteristics of the molding but also by the nature of its longitudinal curvature.

A further object of the present invention is to provide an improved ornamental and protective molding of the nature specified above, with the longitudinal resiliency of the molding operating to keep the ends of the molding pressed firmly against the outside surfaces of the door edge.

Further objects and advantages of this invention will be apparent from the following description and appended claim reference being had to the accompanying drawings forming a part of this specification, wherein like reference characters designate corresponding parts in the several views.

Figure 1:
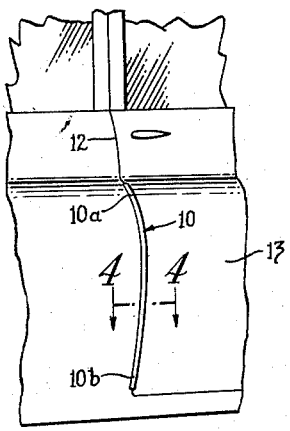
Fig. 1 is a fragmentary perspective view of a portion of a motor vehicle body, showing ornamental and protective molding applied to the trailing edge of the door thereof.

It is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not of limitation.

In accordance with the invention, I utilize resiliency of the molding material to improve grasp of the molding on the vehicle edge not only through the cross section of the molding but also through the length thereof. I attain such result by imparting to the molding a longitudinal configuration slightly different than that of the edge to which the molding is to be applied, in order that the molding becomes tensioned longitudinally when applied to the door edge. Such tensioning is particularly advantageous when it operates in a direction transverse to the cross section of the molding, i. e., in the plane of the minor axis of its cross section, to have the sides of the molding press against the sides of the vehicle edge. It is important that the ends of the molding on the outside of the vehicle are pressed down against the surface of the vehicle and have no tendency to "stick up," i. e., stay away from such surface. Therefore, generally it is desirable to have the molding with longitudinal curvature smaller than that of the edge for those portions of the edge which bulge outwardly of the vehicle, i. e., having centers of their curvature inwardly of the door, larger than the curvature for the portions of the edge having longitudinal curvature caving inwardly of the vehicle, i. e., have curvature with centers outside of the door, the curvature of the molding should be larger than that of the edge.

Imparting different curvature to the molding in the direction of the major axis of its cross section, i. e., longitudinally of its cross section, is also of advantage. For instance, when the door edge appears straight in the side view, the molding may have a slight longitudinal curvature imparted to it to have its ends go on the edge first. In other words, if the door edge is curved with centers of the curvature inside of the door, the curvature of the molding should preferably be smaller. If the door edge is curved with centers of the curvature being outside of the door, the curvature of the molding should preferably be larger.

The molding is preferably made of resilient sheet metal, such as spring steel, but other resilient materials may also be used.

Referring specifically to the drawing, and particularly to Figs. 1-4 thereof, the ornamental and protective molding shown therein and generally designated by the numeral 10 is shaped to be applied to the portion 11 of the trailing edge 12 of an automobile door 13. The portion 11 of the edge 12 has longitudinal curvature of two-dimensional nature, i. e., it appears as a curve in one view, see Fig. 2, and as a straight line in another view, see Fig. 3. As can be seen from an examination of Fig. 2, the longitudinal curvature of the edge portion 11 is bulging outwardly of the vehicle, i. e., the centers O, $O_1$, $O_2$, $O_3$ thereof lie inwardly of the door 13.

Figure 4:
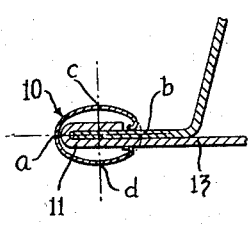
Fig. 4 is a sectional view taken in the direction of the arrows on the section plane passing through the section line 4—4 of Fig. 1.

As is shown in Fig. 4, the molding 10 has a substantially oval or elliptical cross section with one end thereof being open to enable the molding to go over the edge 11 and grasp the same. The molding 10 may be applied either directly to the edge 11, or over a number of clips such as are disclosed in my Patent No. 2,685,472. The major and the minor axes of the cross section of the molding are designated as a–b and c–d, respectively.

Figure 2:
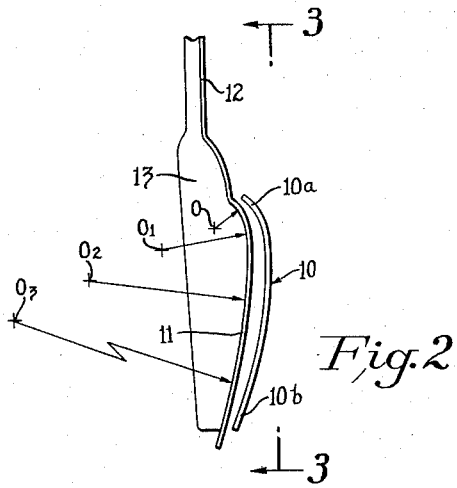
Fig. 2 is an end view taken on the trailing end of the door, with the molding being shown adjacent the edge of the door but prior to application thereto.

As shown in Fig. 2, the longitudinal curvature of the molding 10 prior to its application to the edge 11 is generally similar to that of said edge, but it is smaller or "sharper," i. e., has smaller radii, than the longitudinal curvature of the edge 11. Therefore, in application, the molding 10 is being tensioned by being flattened out as it is applied to the edge 11. When the molding 10 is fully applied to the edge 11, the outside portions of its ends 10a and 10b press against the outside surfaces 14 of the edge 11 and thus contribute to better holding of the molding on the edge. It will be understood at this point that if the curvature of the molding 10 was of greater radii than curvature of the edge 11, the edge-gripping characteristics of the molding could remain substantially the same, but the ends of the molding might tend to "stand away" from the edge of the door at the outside thereof and present the danger of catching or scratching whatever may rub against or pass by them. With the smaller curvature of the molding 10, there may be a tendency of the inner sides of the ends 10a and 10b to "stand away" from the inner edge of the door, but such tendency does not present the same danger since they are on the inside of the door edge.

Figure 3:
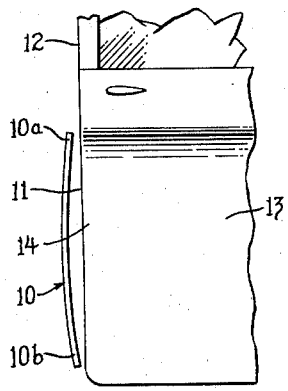
Fig. 3 is a side view of the door, with the molding shown adjacent to the trailing edge thereof but prior to application thereto.

While the edge 11 has longitudinal curvature of two dimensional nature, the molding 10 illustrated in Figs. 1–4 has longitudinal curvature of three-dimensional nature, and therefore, it appears curved in both views, i. e., both Fig. 2 and Fig. 3. Therefore, when the molding 10 is being applied to the edge 11, its ends 10a and 10b contact the edge to go on it first. By virtue of such an expedient the ends of the molding tend to remain on the edge, even if the middle thereof comes off.

Figure 5:
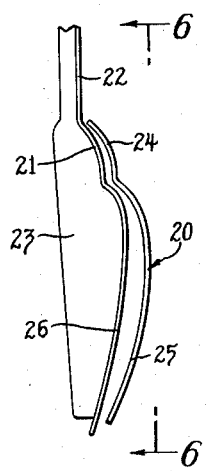
Figs. 5 and 6 are views similar to Figs. 2 and 3 but showing the door edge and a molding therefor, both being of three dimensional curvature.
Figure 6:
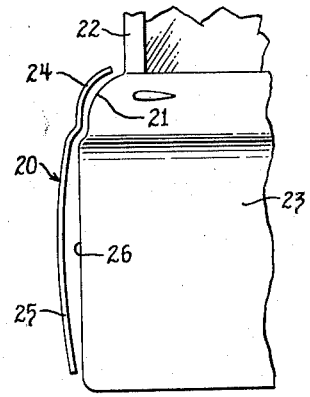

Figs. 5 and 6 illustrate an automobile door 23, the portion 21 of the trailing edge 22 whereof has a three-dimensional curvature part, which part therefore appears curved in both views, i. e., in Figs. 5 and 6. In accordance with the invention, the longitudinal curvature of the portion 24 of the molding 20 is smaller than that of the corresponding portion of the edge 22. The lower portion 25 of the molding 20, as well as the lower portion 26 of the edge 22 are similar to those of the construction of Figs. 1–4.

Figure 7:
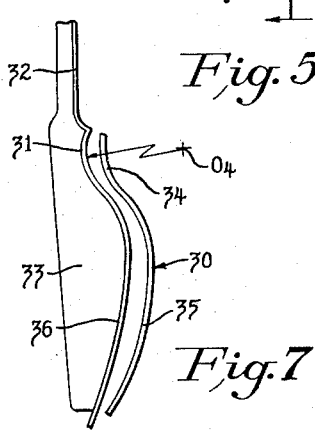
Fig. 7 is a view similar to Figs. 2 and 5 but showing the edge of the molding with portions having curvature caving toward the interior of the body.

Fig. 7 illustrates an automobile door 33, the portion 31 of the trailing edge 32 whereof has longitudinal curvature caving inwardly of the vehicle, i. e., curvature having its center or centers on the outside of the vehicle, such as is center $O_4$ illustrated in Fig. 7. As shown in Fig. 7, the portion 34 of the molding 30 has curvature of greater radii than the corresponding portion 31 of the door edge. Thus, when applied, this portion will be tensioned, with its upper end pressing against the outer surface of the edge 31, and will thus prevent said end from "standing away" from the surface of the door edge on the outside thereof. The portion 35 has longitudinal curvature of smaller radii than the portion 36 of the edge 32.

It will be understood that the exact amount or degree of difference between the respective curvatures of the door edge and the molding is best determined experimentally, since it depends upon the spring characteristics of the material, its thickness and dimensional specifications of the molding. I have found that for average conditions a difference of approximately 30% in the radii of the respective curvatures gives good results.

It will also be understood that while decreasing the curvature on the molding for portions of the door edges bulging outwardly, and increasing the radii of curvatures for the molding intended to be applied to portions of a door edge caving in toward the interior of the vehicle, is preferable. However, the reverse of this expedient may also be operative, providing there is sufficient resiliency in the molding cross section to compensate for the tendency of the ends to "stay away" from the door surface.

There is thus provided an improved ornamental and protective molding whereby the objects of the present invention listed above and numerous additional advantages are attained.

I claim:

An ornamental and protective molding for a trailing edge of an automobile door, with said edge having curved longitudinal configuration at least transversely to the general plane of the door, said molding being made of a resilient metal material and having a substantially oval cross section with one end thereof being open to go over said edge and to embrace the same, said molding having longitudinal configuration generally corresponding to that of said edge but with the longitudinal curvature of the molding in the plane transverse to the general plane of the door being greater than that of the corresponding portions of the door edge having convex curvature, and smaller than that of the corresponding portion of the door edge having concave curvature.

References Cited in the file of this patent

UNITED STATES PATENTS

| | | |
|---|---|---|
| 1,542,481 | Spiro | June 16, 1925 |
| 1,553,913 | Regenstein | Sept. 15, 1925 |
| 2,109,666 | Ferguson | Mar. 1, 1938 |
| 2,226,615 | Killen | Dec. 31, 1940 |
| 2,685,473 | Adell | Aug. 3, 1954 |
| 2,704,687 | Adell | Mar. 22, 1955 |